(12) United States Patent
Kabir et al.

(10) Patent No.: US 12,189,376 B2
(45) Date of Patent: Jan. 7, 2025

(54) OUTLIER DETECTION AND MANAGEMENT

(71) Applicants: The Boeing Company, Chicago, IL (US); University of Washington, Seattle, WA (US)

(72) Inventors: Mohammed H. Kabir, Mukilteo, WA (US); Alan Douglas Byar, Issaquah, WA (US); John J. Dong, Bothell, WA (US); Alexandru I. Stere, Mukilteo, WA (US); Todd Clayton DePauw, Mukilteo, WA (US); Christina M. Doty, Seattle, WA (US); Ashith Paulson Kunnel Joseph, Seattle, WA (US); Navid Zobeiry, Bothell, WA (US)

(73) Assignees: The Boeing Company, Chicago, IL (US); University of Washington, Seattle, WA (US)

( * ) Notice: Subject to any disclaimer, the term of this patent is extended or adjusted under 35 U.S.C. 154(b) by 464 days.

(21) Appl. No.: 17/654,087

(22) Filed: Mar. 9, 2022

(65) Prior Publication Data
US 2023/0288918 A1    Sep. 14, 2023

(51) Int. Cl.
*G05B 19/418*    (2006.01)
*G06F 18/2433*   (2023.01)

(52) U.S. Cl.
CPC ... *G05B 19/41865* (2013.01); *G05B 19/4183* (2013.01); *G05B 19/41885* (2013.01); *G06F 18/2433* (2023.01)

(58) Field of Classification Search
CPC .......... G05B 19/41865; G05B 19/4183; G05B 19/41885; G05B 19/41875; G06F 18/2433
See application file for complete search history.

(56) References Cited

U.S. PATENT DOCUMENTS

| | | | |
|---|---|---|---|
| 2004/0267477 A1* | 12/2004 | Scott ................... | G05B 23/0294 702/108 |
| 2010/0049340 A1* | 2/2010 | Smits ................. | G05B 13/0265 706/13 |
| 2012/0049881 A1* | 3/2012 | Johnson ............. | G01R 31/2894 324/762.01 |
| 2024/0054187 A1* | 2/2024 | Nozawa ................ | G06F 18/241 |

* cited by examiner

*Primary Examiner* — Yuhui R Pan
(74) *Attorney, Agent, or Firm* — Yee & Associates, P.C.

(57) ABSTRACT

A method, apparatus, system, and computer program products for managing a set of outliers in test data. A computer system analyzes a set of features derived from the test data using different outlier detection methods to generate a result of the set of outliers identified by the different outlier detection methods. The test data is obtained from testing a physical structure. The computer system determines a causality for the set of outliers in the result. The physical structure is retested with a set of changes determined using the causality identified for the set of outliers. The retesting generates new test data for the physical structure.

23 Claims, 12 Drawing Sheets

| OUTLIER TYPES | CAUSES |
|---|---|
| TYPE 1 | PREMATURE FAILURE |
| TYPE 2 | STIFFNESS VARIATION |
| TYPE 3 | STIFFNESS ERROR |
| TYPE 4 | NONLINEAR VARIATION |
| TYPE 5 | NOISY DATA |
| TYPE 6 | UNEXPECTED LOAD DROP |
| TYPE 7 | DIFFERENT DAMAGE MODES |

| Outlier Detection Method | Feature Type | Type 1 | Type 2 | Type 3 | Type 4 | Type 5 | Type 6 | Type 7 |
|---|---|---|---|---|---|---|---|---|
| ROBUST PRINCIPAL COMPONENT ANALYSIS (RPCA) | STANDARD ALL FEATURES | X | | | | | | |
| SPRAGUE-GEERS (SG) | STANDARD ALL FEATURES | X | X | X | | | X | |
| RPCA | TRANSFORMED FEATURES | X | | X | X | X | X | |
| RPCA | SELECTED FEATURES | X | X | X | X | | | X |
| SG | SELECTED FEATURES | X | | | X | | | X |

FIG. 5

OUTLIER DETECTION AND MANAGEMENT

BACKGROUND INFORMATION

1. Field

The present disclosure relates generally to improved computer system and in particular, to outlier management of test data.

2. Background

In aerospace, automotive, and other industries, physical tests are performed for products and physical structures forming the products. The test data resulting from the test or recorded and process to evaluate performance, evaluate a quality of design, validate a simulation model, or analyze the data to certify the structure or product. These tests can include testing structures such as composite parts. For example, with composite parts, physical tests are performed that generate data about the response of the composite parts. The response can be measured using properties such as tensile strength, compressive strength, flexural properties, shear strength, void content, dynamic mechanical properties, and other properties.

The accuracy of test data generated from performing tests on composite parts is important to properly evaluate physical structures and to meet government regulations in order to certify the physical structures for use. Outliers in the test data can affect the validity of the test data. These outliers can include noise. Reducing outliers to meet standards for valid test data can be more time-consuming and challenging than desired.

SUMMARY

In one illustrative example, a method manages a set of outliers in test data. A computer system analyzes a set of features derived from the test data using different outlier detection methods to generate a result of the set of outliers identified by the different outlier detection methods. The test data is obtained from testing a physical structure. The computer system determines a causality for the set of outliers in the result. The physical structure is retested with a set of changes determined using the causality identified for the set of outliers. The retesting generates new test data for the physical structure. According to other illustrative examples, a system and a computer program product for managing outliers are provided.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

FIG. 5 is an illustration of outlier detection methods in accordance with an illustrative example;

DETAILED DESCRIPTION

The illustrative examples recognize and take into account one or more different considerations as described below. For example, illustrative examples recognize and take into account that it would be desirable to have a method and apparatus that overcome a technical problem with reducing noise and outliers in test data. For example, the illustrative examples recognize and take into account that various factors can contribute to the presence of outliers in test data. For example, improper test sample preparation, excessive processing defects, improper acquisition of test data during testing, and equipment error are some examples of factors that can cause outliers and noise to be present in test data. Multiple factors can be present leading to the formation of different types of outliers, affecting the accuracy of the test data. Undetected outliers can lead to improper characterization of material properties of physical structures.

Current outlier detection techniques have a number of challenges. For example, the illustrative examples recognize and take into account current outlier detection techniques are unable to detect all types of outliers. Further, as the amount of test data decreases, it becomes more challenging to detect outliers using current outlier detection techniques. Additionally, one manner in which test data is examined for outliers involves operator know-how, engineering judgment, and experience. This type of technique can introduce error.

Thus, the illustrative examples provide a method, apparatus, system, and computer program product for managing outliers. In one illustrative example, a set of features derived from the test data is analyzed using a plurality of outlier detection methods to generate a result of outliers identified by the plurality outlier detection methods, wherein the test data is obtained from testing a physical structure. A causality for a set of outliers in the result matrix is determined. Retesting of the physical structure the physical structure can be performed with a set of changes determined based on the causality identified for the set of outliers. The retesting generates new test data for the physical structure.

Figure 1:
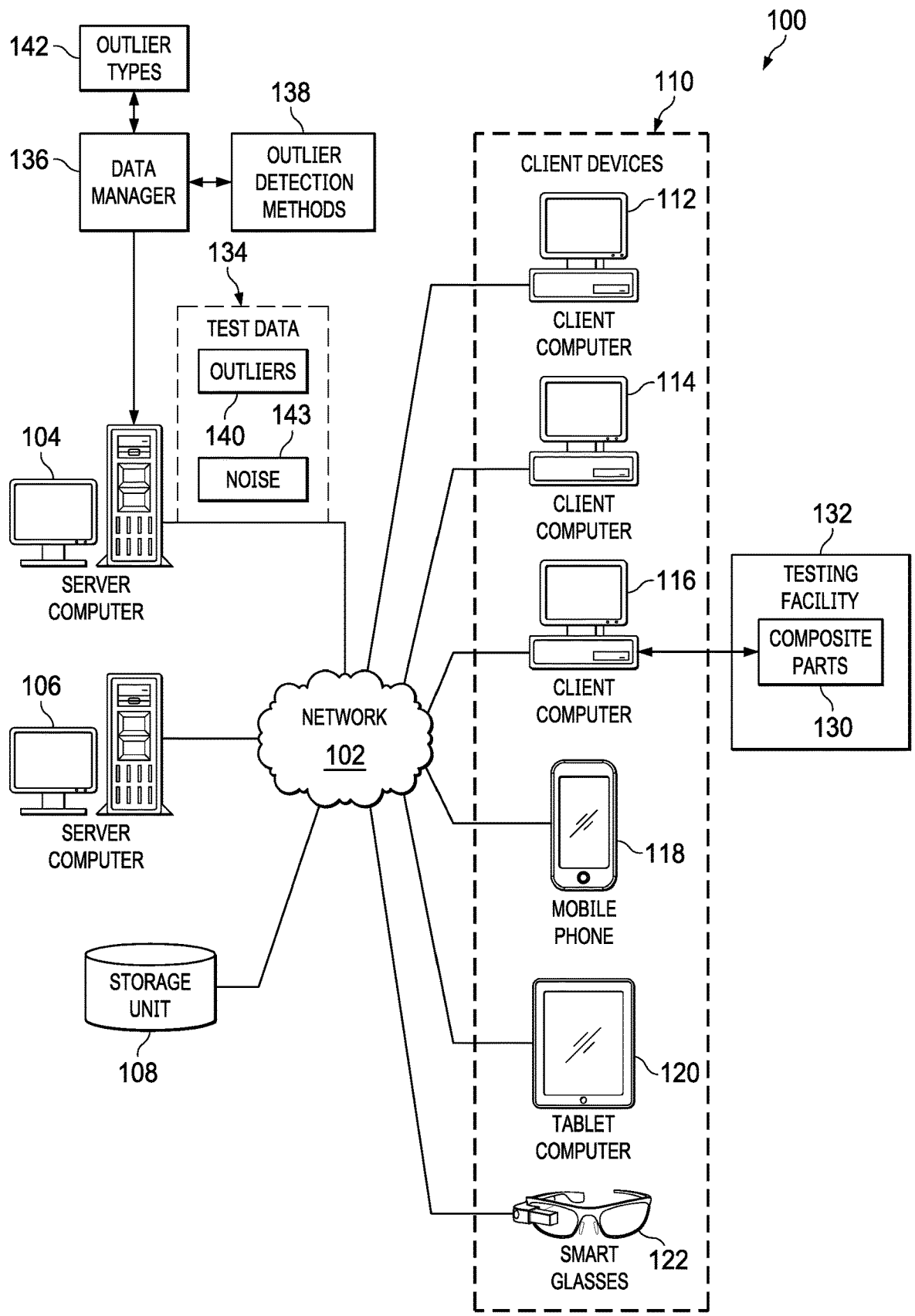
FIG. 1 is a pictorial representation of a network of data processing systems in which illustrative examples may be implemented.

With reference now to the figures and, in particular, with reference to FIG. 1, a pictorial representation of a network of data processing systems is depicted in which illustrative examples may be implemented. Network data processing system 100 is a network of computers in which the illustrative examples may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage media and downloaded to a data processing system or other device for use. For example, program instructions can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). In this illustrative example, network data processing system 100 can be used to provide a cloud computing environment. FIG. 1 is intended as an example, and not as an architectural limitation for the different illustrative examples.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, physical structures in the form composite parts 130 are tested in testing facility 132. The testing of composite parts 130 can include the determination of bulk properties through the use of tension, compression, and share tests. These tests can be used explore properties of composite parts 130 such as open hole tension, open hole compression, interim laminar fracture toughness, compression after impact, fatigue, and other properties. These tests can be performed over a range of environments. This testing of composite parts 130 generates test data 134. In this illustrative example, client computer 114 sends test data 134 over network 102 to data manager 136 located in server computer 104 for processing.

Data manager 136 manages test data 134. For example, data manager 136 can analyze test data 134, identify outliers in test data 134, reduce noise in test data 134, or perform other operations on test data 134. In managing test data 134, data manager 136 can identify outliers more efficiently as compared to current techniques for outlier detection. For example, data manager 136 can use multiple ones of outlier detection methods 138 to analyze test data 134 to detect outliers 140 in test data 134. In this illustrative example, outlier detection methods 138 comprises detection methods that are suitable for detecting different types of outliers 140.

The selection of outlier detection methods 138 can be made such that different outlier detection methods can identify different outliers such that the group of outlier detection methods 138 can detect more types of outliers as compared to individual outlier detection methods. As result, the selection of two or more of different ones of detection methods 138 can provide increase performance in detecting outliers as compared to current techniques.

In this illustrative example, data manager 136 can identify outlier types 142 for outliers 140 identified in test data 134. Additionally, data manager 136 can identify the cause of outliers 140 based on the determination of outlier types 142. By identifying the cause of outliers 140, data manager 136 can determine whether the testing of composite parts 130 is needed.

Data manager 136 can retest composite parts 130 in a number of different ways. The retesting can be initiated by data manager 136 sending at least one of instructions, commands, or other types of information to testing facility 132. The retesting of composite parts 130 can involve changing one or more measurement processes used by testing facility 132 to test composite parts 130.

As another example, data manager 136 may determine that one or more of outliers 140 is caused by composite parts 130 not meeting specifications for composite parts 130. With this type of causation of an outlier, data manager 136 can retest composite parts 130 by having composite parts 130 remanufactured with changes in manufacturing such that the remanufactured version of composite parts 130 meet specifications for composite parts 130. This retesting generates new test data that can be analyzed.

Further, in managing test data 134 data manager 136 can also remove noise 143 from test data 134. Thus, data manager 136 can manage test data 134 to provide test data 134 that can be used to show that composite parts 130 meets criteria or specifications specified by regulations, a manufacturer, or other source.

Figure 2:
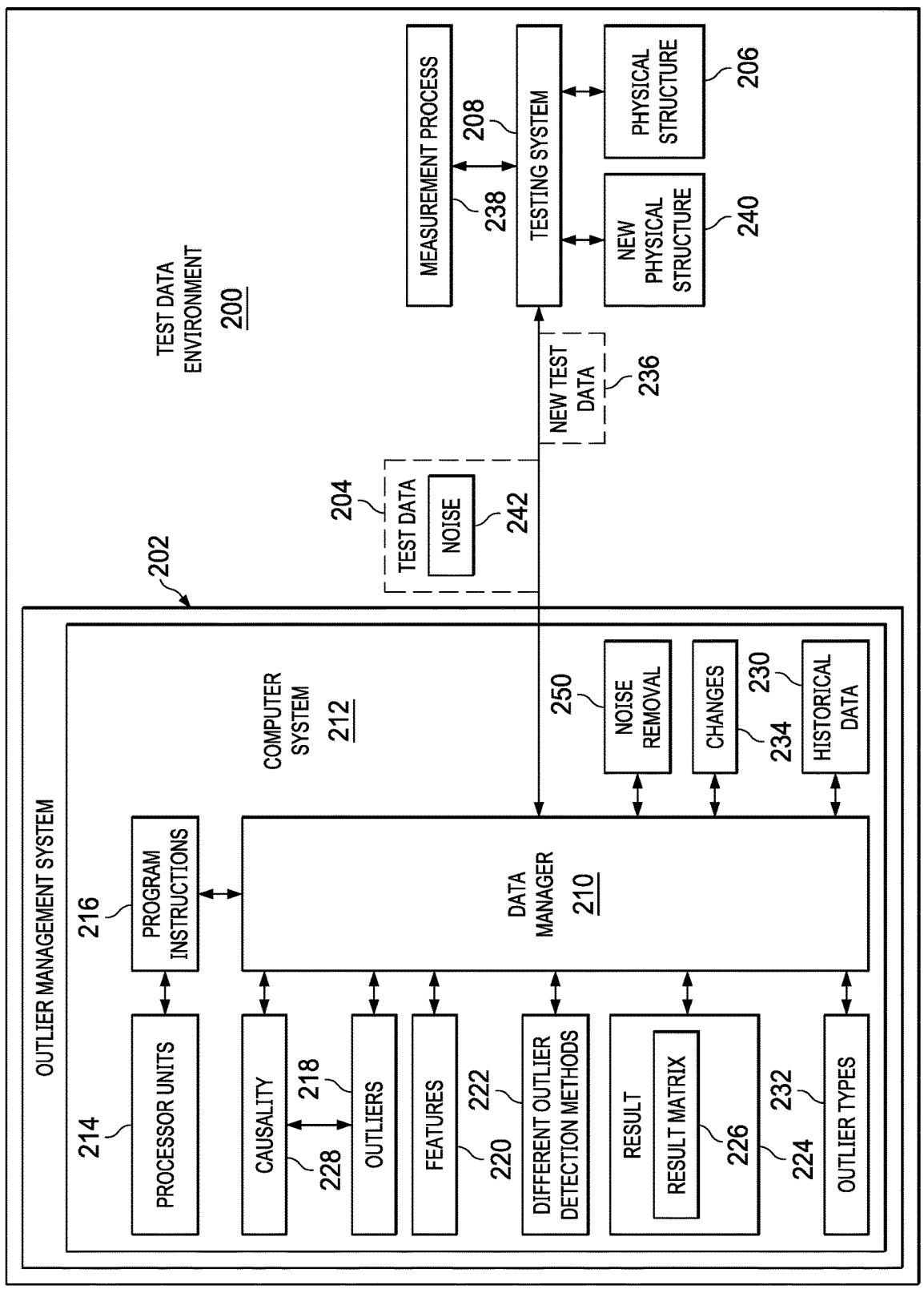
FIG. 2 is an illustration of a test data environment in accordance with an illustrative example.

With reference next to FIG. 2, an illustration of a test data environment is depicted in accordance with an illustrative example. In this illustrative example, test data environment 200 includes components that can be implemented in hardware such as the hardware shown in network data processing system 100 in FIG. 1.

In this illustrative example, outlier management system 202 in test data environment 200 can operate to process test data 204. As depicted, test data 204 is generated from testing of physical structure 206 by testing system 208.

In this illustrative example, the testing of physical structure 206 is a set of physical tests performed on physical structure 206. Physical structure 206 can take a number of different forms. For example, physical structure 206 can be selected from a group comprising a composite part, a test coupon, an assembly, a system, an alloy part, metal structure, and other types of physical structures. In this illustrative example, a composite part can be, for example, a skin panel, a wing, or some other suitable type of composite part. A system or assembly can be comprised of multiple materials. For example, an assembly can be comprised of parts formed from composite materials, plastic materials, and metal materials.

Testing system 208 can be one or more pieces of test equipment that can be used to perform tests on physical structure 206. This test equipment can be used to perform testing such as hardness testing, impact testing, fracture toughness testing, pretesting, fatigue testing, nondestructive testing, and other types of testing to generate test data 204.

Test data 204 is sent from testing system 208 to outlier management system 202 for processing. As depicted, outlier management system 202 comprises data manager 210 in computer system 212.

Data manager 210 can be implemented in software, hardware, firmware or a combination thereof. When software is used, the operations performed by data manager 210 can be implemented in program code configured to run on hardware, such as a processor unit. When firmware is used, the operations performed by data manager 210 can be implemented in program code and data and stored in persistent memory to run on a processor unit. When hardware is employed, the hardware can include circuits that operate to perform the operations in data manager 210.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 214 that are capable of executing program instructions 216 implementing processes in the illustrative examples. As used herein a processor unit in the number of processor units 214 is a hardware device and is comprised of hardware circuits such as those on an integrated circuit that respond and process instructions and program code that operate a computer. When a number of processor units 214 execute program instructions 216 for a process, the number of processor units 214 is one or more processor units that can be on the same computer or on different computers. In other words, the process can be distributed between processor units on the same or different computers in a computer system. Further, the number of processor units 214 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, data manager 210 in computer system 212 can detect outliers 218 for set of features 220 using different outlier detection methods 222. In this illustrative example, data manager 210 can identify the set of features 220 from test data 204. In this illustrative example, a feature in the set of features 220 represents an individual measurable property or characteristic of a phenomenon for physical structure 206. The feature can be a physical response or failure mode that can occur for physical structure 206. For example, a feature can be a peak in a forced displacement curve, a length of a crack in an image, or some other suitable feature.

Different outlier detection methods 222 can take a number of different forms. For example, different outlier detection methods 222 can be selected from two or more of a cosine similarity, a correlation analysis, a principal component analysis, a Sprague-Geers analysis, a robust principal component analysis, or some other suitable outlier detection method that is currently available. In this example, different outlier detection methods 222 can compare different parameters. For example, different outlier detection methods can compare at least one of lengths, angles, Eigen values, Eigen vectors, or other metrics or combinations of metrics used for outlier detection in different outlier detection methods 222.

Further, the phrase "two or more of," when used with a list of items, means different combinations of two or more of the listed items can be used, and only one of each item in the list may be needed. In other words, "two or more of" means any combination of items and number of items may be used from the list, but not all of the items in the list are required. The item can be a particular object, a thing, or a category.

For example, without limitation, "two or more of item A, item B, or item C" may include item A and item B, item A and item C, or item B and item C. This example also may include item A, item B. Of course, any combinations of these items can be present. In some illustrative examples, "two or more of" can be, for example, without limitation, two of item A and item B; one of item B and 3 of item C; and ten of item C; four of item B and seven of item C; or other suitable combinations.

As depicted, data manager 210 generates result 224 of a set of outliers 218 identified by each outlier detection in different outlier detection methods 222. In one illustrative example, result 224 can take the form of result matrix 226 for identifying outliers 218. Result matrix 226 identifies outliers 218 and outlier detection methods that identified outliers 218.

Further, data manager 210 can determine causality 228 for the set of outliers 218. Causality 228 for an outlier in the set of outliers 218 is an identification of a cause of the outlier. Causality 228 can be determined using historical data 230 from prior tests and analysis of physical structures.

In some cases, and outlier in the set of outliers 218 can be an outlier without causality 228. This type of outlier can be discarded.

In determining causality 228, data manager 210 identifies a set of outlier types 232 for an outlier in result 224. In other words, an outlier can have one more than one outlier type. Data manager 210 determines causality 228 for the outlier using the set of outlier types 232 identified for the outlier.

In this illustrative example, data manager 210 can retest physical structure 206 with a set of changes 234 determined using causality 228 identified for the set of outliers 218. The set of changes 234 can take a number of different forms. For example, the set of changes 234 can be selected from at least one of changes comprises at least one of a measurement process change, a geometry change, a manufacturing parameter change, a manufacturing process change, or some other suitable change.

The retesting generates new test data 236 for physical structure 206. As depicted, new test data 236 can be analyzed by data manager 210 to determine a presence of outliers 218.

The retesting can comprise retesting physical structure 206 using a change to measurement process 238 used in testing system 208 in response to causality 228 indicating that measurement process 238 was a cause of an outlier in the set of outliers 218. The change in the measurement process can be, for example, changing measurement equipment, recalibrating measurement equipment, changing a measurement technique, adding a new measurement process, changing handling of physical structure 206 during testing, or some other suitable change in measurement process 238.

In another the example, the retesting can involve data manager 210 manufacturing new physical structure 240 with the set of changes 234 identified and retesting new physical structure 240. In this illustrative example, physical structure 206 may have an incorrect dimension. For example, physical structure 206 may have a thickness that is less than the specified thickness for physical structure 206. In this example, the change is a geometry change made to remanufacture is physical structure 206 with the specified thickness. In another example, physical structure 206 using a waterjet. The waterjet cause inconsistencies. The change can include cutting physical structure 206 using a diamond cutter.

Additionally, data manager 210 can remove noise 242 in outliers 218 from test data 204 as well as other types of outliers 218. For example, data manager 210 can remove noise 242 from the set of features 220 using at least one of removing noise 242 in outliers 218 prior to analyzing the set of features 220 derived from test data 204 using different outlier detection methods 222 or using an outlier detection method in different outlier detection methods 222 that removes noise 242 in outliers 218.

The illustration of test data environment 200 in FIG. 2 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, the testing of physical structure 206 can be performed using a simulation of physical structure 206. With this type of implementation, testing system 208 can be, for example, a simulation model such as a finite element analysis model.

Additionally, the illustrative example can also use different types of features including transform features based on theory and governing physics of the problem to find the underlying features. This type of feature can also be referred to as a theory guided feature transformation. This transformed data can be analyzed using the different outlier detection methods with greater accuracy as compared to current techniques.

In yet another example, retesting physical structure 206 is unnecessary. Test data 204 with the removal of outliers 218 can provide the quality needed for using test data 204. For example, test data 204 with the removal of outliers 218 can be used validate a simulation model with the outliers 218 removed from features 220.

In another illustrative example, noise removal 250 can be used to remove noise 242 in test data 204 prior to detecting outliers 218 using different outlier detection methods 222. For example, noise removal 250 can use filters for noise reduction processes that may not detect outliers 218.

Figures 3, 4:
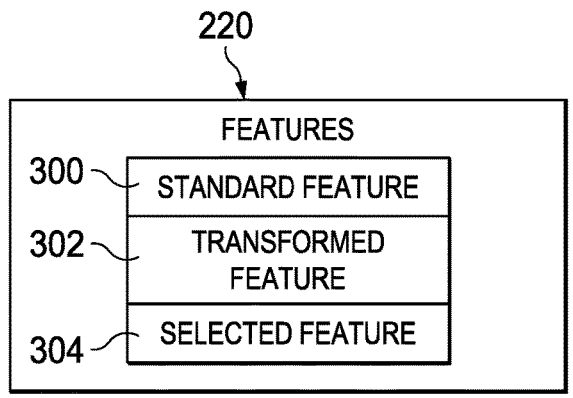
FIG. 3 is an illustration of types of features in accordance with an illustrative example.
FIG. 4 is an illustration of outlier types and causes in accordance with an illustrative example.

Turning now to FIG. 3, an illustration of types of features is depicted in accordance with an illustrative example. In the illustrative examples, the same reference numeral may be used in more than one figure. This reuse of a reference numeral in different figures represents the same element in the different figures.

Features 220 can take a number of different forms that can be identified by data manager 210 for use in detecting outliers 218 using different outlier detection methods 222. As depicted, the set of features 220 can be selected from at least one of standard feature 300, transformed feature 302, or selected feature 304. In other words, the set of features 220 can be one or more of these feature types and can be in any combination.

In this illustrative example, standard feature 300 comprises test data 204 from a test. In this illustrative example, test data 204 can be, for example, data from multiple tests performed multiple times or from a single test performed multiple times. Standard feature 300 can be, for example, test data for a force displacement curve from values in the test data from a test measuring displacement of physical structure 206 in response to force.

In another example, standard feature 300 can be an image. The image can be an image of a failure, fracture, the elimination, or other type of image showing the response of physical structure 206.

In this illustrative example, transformed feature 302 is test data 204 that has been transformed by a mathematical operation. Transformed feature 302 can also be referred to as a theory guided feature. For example, transformed feature 302 can be result of a derivative of test data 204, an integral of test data 204, or from some other mathematical operation performed on test data 204.

For example, the derivative of test data 204 from a force displacement test can be a tangent or secant stiffness. The integral of test data from a force displacement test can be fractured energy. The selection of the operation performed in the test data is driven by an understanding of the response of the material. For example, the response can be a failure, delamination, or fracture of the material.

Selected feature 304 is a selection of a portion of test data 204. For example, selected feature 304 can be a peak of a force displacement curve, an area of interest in a force displacement curve, a slope of a line, or other selected feature. In other words, selected feature 304 can be a subset of test data 204 containing data of interest.

In another example, selected feature 304 can be a portion of an image. For example, selected feature 304 can be a length of a crack, a number of parallel lines, or some other selected feature in an image.

In one illustrative example, one or more technical solutions are present that overcome a technical problem with detecting outliers in test data. As a result, one or more technical solutions can provide a technical effect enabling managing outliers using a plurality of different types of outlier detection methods.

Turning to FIG. 4, an illustration of outlier types and causes is depicted in accordance with an illustrative example. In this illustrative example, table 500 depicts outlier types 401 and causes 421 of outlier types 401. These outlier types are examples of some of the different types of outliers that can be present along with causes 421 for outlier types 401. As depicted, outlier types 401 comprise type 1 402, type 2 404, type 3 406, type 4 408, type 5 410, type 6 412, and type 7 414.

In this illustrative example, type 1 402 is caused by premature failure 403. Premature failure 403 can be due to defects or other issues resulting from manufacturing variability in physical structure 206. Type 2 404 is caused by stiffness variation 405. In this example, stiffness variation 405 can result from, for example, from at least one of improper strange gauge measurements, improper layout, or improper cutting of physical structure 206.

As depicted, type 3 406 is caused by stiffness error 407. Stiffness error 407 can occur due to tabs sliding, loading fixture rotation, or other test fixture issues in handling the physical structure 206 during the testing process.

Type 4 408 is caused by nonlinear variation 409. Nonlinear variation 409 can be identified from jumps in loading and load displacement data which can occur in response to manufacturing variability in physical structure 206.

In another example, type 5 410 is caused by noisy data 411, which can be caused by test equipment. For example, a faulty strain gauge or other data acquisition system equipment can cause this type of outlier. Noise filtering may be used to obtain an acceptable amount of data without retesting. Type 6 412 is caused by unexpected load drop 413. This unexpected load drop can occur due to delamination of physical structure 206.

As depicted, type 7 414 is caused by different damage modes 415. These damage modes are present in images of the physical structure and are caused by testing the physical structure.

The outlier types are examples of different outlier types for outliers 218 in FIG. 2. By identifying the different types of outliers 218, causes 421 associated with those outliers can be identified. Some of causes 421 may simply require performing noise removal.

In other illustrative examples, causes 421 can be true outliers that may be discarded. In other illustrative examples, causes of causes 421 can be used to determine a set of changes 234 that may need to be performed in retesting physical structure 206. This retesting may include at least one of changes to the measurement processor or remanufacturing physical structure 206 with changes to obtain suitable test data.

With reference next to FIG. 5, an illustration of outlier detection methods is depicted in accordance with an illustrative example. Table 500 identifies the outlier detection method in column 502 and the feature type in column 504 for the data analyzed by the outlier detection method.

Table 500 also identifies outlier types that can be detected by each outlier detection method using a particular feature type. In this example, type 1 is column 508, type 2 is column 510, type 3 is column 512, type 4 is column 514, type 5 is column 516, type 6 is column 518, and type 7 is in column 519. These outlier types correspond to the outlier types 401 described in FIG. 4.

In row 520, robust principal component analysis (RPCA) is the outlier detection that that can be used with standard features. This type of outlier detection method can compare sparse matrices. This type of outlier detection method can also automatically remove noise as part of the outlier detection process. With standard features, robust principal component analysis can detect type 1, type 5, and type 6 outliers.

Next, in row 522, Sprague-Geers (SG) comprehensive error is a type of outlier detection method that can be used to detect outliers using standard features. With this type of test data, Sprague-Geers comprehensive error can detect type 1, type 2, and type 3 outliers.

Next, robust principal component analysis in row 524 can be used with transform features to detect outliers. With transform features, robust principal component analysis can detect type 1, type 3, type 4, type 5, and type 6 outliers. In row 526, robust principal component analysis is used with selected features to detect outliers. With the use of selected features, robust principal component analysis can detect type 1, type 2, type 3, and type 4 outliers.

In row 528, Sprague-Geers (SG) comprehensive error is used with selected features to detect outliers. In this example, Sprague-Geers (SG) comprehensive error can detect type 1, type 4, and type 7 outliers.

Thus, with selection of different outlier detection methods, all of the different types of outliers can be detected. This illustration is not meant to limit the manner in which other selections of outliers can be made for different outlier detection methods 222 in FIG. 2. Other numbers and other types of outlier detection methods can be used depending on the particular implementation. The selection of the outlier detection methods for use in different outlier detection methods 222 can be made such that the different types of outliers can be detected. As result, all outlier types of interest can be detected even though a particular outlier detection method is unable to detect all of the outlier types of interest.

Figure 6:
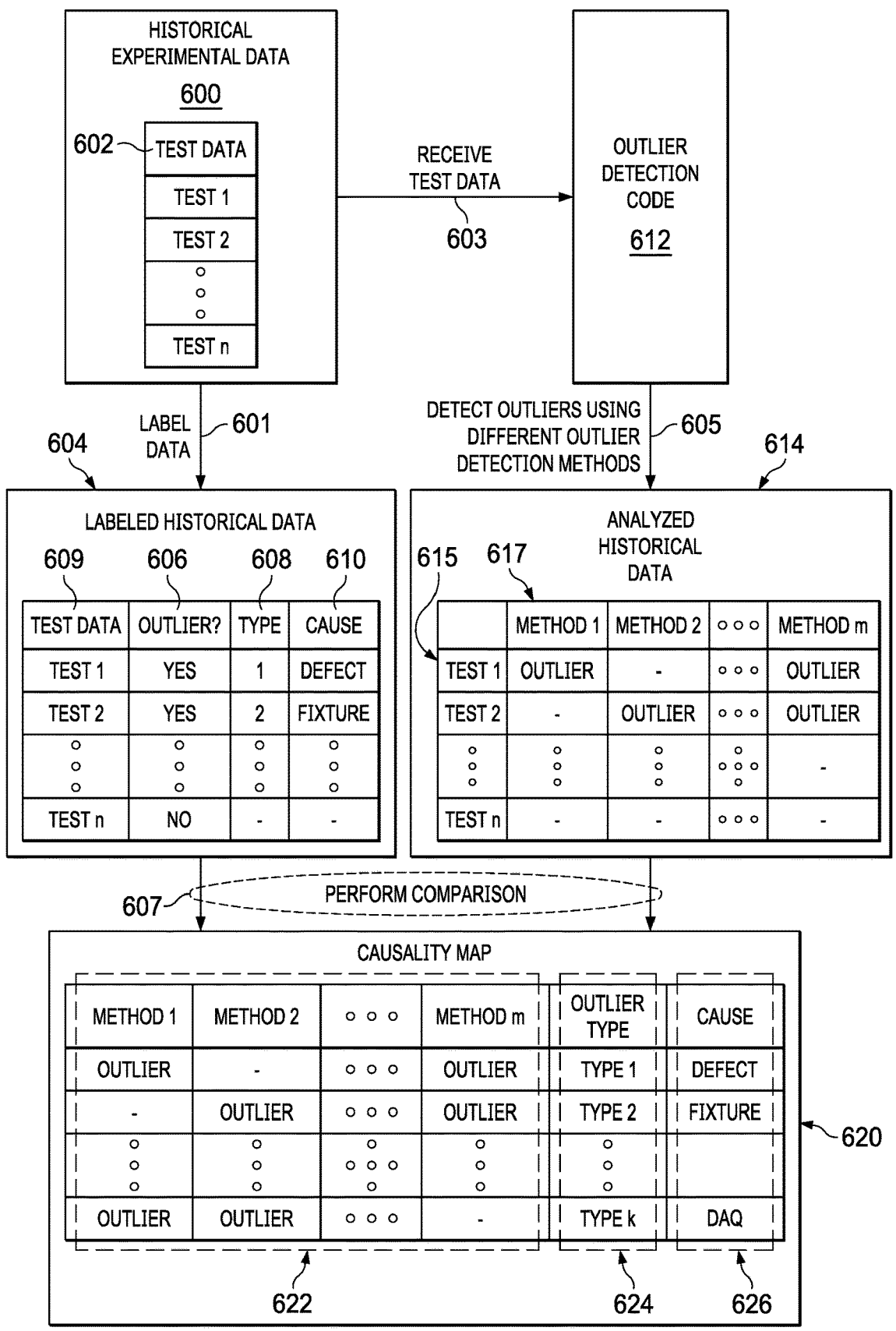
FIG. 6 is an illustration of dataflow in identifying causality for various outliers in accordance with an illustrative example.

Turning to FIG. 6, an illustration of dataflow in identifying causality for various outliers is depicted in accordance with an illustrative example. As depicted, historical experimental data 600 is test data 602 obtained from prior testing of physical structures. Historical experimental data 600 comprises test data 602 from tests performed on a physical structure. Historical experimental data 600 can be labeled to form labeled historical data 604 (operation 601). In this illustrative example, labeled historical data 604 can include test data identification 609, outlier presence 606, outlier type 608, and cause 610 for the different outlier types.

This information can be determined by engineers or other subject matter experts analyzing test data 602 from different tests and historical experimental data 600. In other illustrative examples, the test data can also be analyzed using models or other software systems.

In this illustrative example, outlier detection code 612 is program code implementing outlier detection methods. Outlier detection code 612 can receive test data 602 (operation 603) and detect outliers using different outlier detection methods (operation 605).

The result of this process is analyzed historical data 614. Analyzed historical data 614 identifies which of the different outlier detection methods identified in columns 617 detected outliers in different sets of test data 602 identified in rows 615 in analyzed historical data 614.

Labeled historical data 604 is compared with analyzed historical data 614 (operation 607), resulting in causality map 620. As depicted, causality map 620 identifies outlier detection methods and what outliers can be detected by each of the outlier detection method in section 622. Outlier types for the detected outliers in section 622 are identified in section 624. Causality for outlier types in section 624 identified in section 626.

In this illustrative example, causality 228 for outliers 218 detected using different outlier detection methods 222 in FIG. 2 can be identified using causality map 620. As a result, if the test data is not sufficient or outliers 218 are not truly outliers but have causes, a set of changes 234 can be identified for use in retesting physical structure 206.

The illustrative example enables more accurate outlier detection with smaller amounts of test data as compared to current techniques in which the accuracy of outlier detection in these current techniques depend on the amount of test data available. Further, features in the test data can be analyzed using a plurality of different outlier detection methods in the illustrative example.

Thus, the illustrative example can use these different features collectively to detect many types of outliers as well as remove noise from data. This processing of test data can allow identifying the true response to the material absent with the reduction or removal of outliers and noise from the test data.

Computer system 212 can be configured to perform at least one of the steps, operations, or actions described in the different illustrative examples using software, hardware, firmware or a combination thereof. As a result, computer system 212 with data manager 210 operates as a special purpose computer system in which in computer system 212 enables detecting outliers and causes of outliers a more efficient manner as compared to current techniques. For example, data manager 210 transforms computer system 212 into a special purpose computer system as compared to currently available general computer systems that do not have data manager 210.

In the illustrative example, the use of data manager 210 in computer system 212 integrates processes into a practical application for managing outliers in test data to meet goals. This managing of outliers includes retesting a physical structure when outliers are not true outliers and have causes that are identified. With the identified of the causes, data manager 210 in computer system 212 can retest the physical structure with a set of changes identified using because is determined the outliers.

Figure 7:
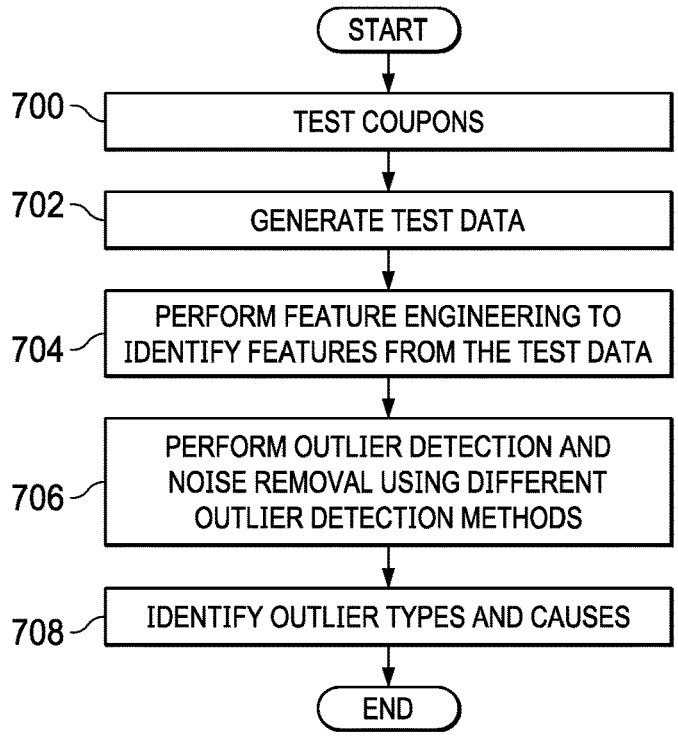
FIG. 7 is an illustration a flowchart of a process for outlier detection in accordance with an illustrative example.

With reference to FIG. 7, an illustration of a flowchart of a process for outlier detection is depicted in accordance with an illustrative example. The process illustrated in this figure can be implemented in hardware, software, or both. When implemented in software, the process can take the form of program code that is run by one of more processor units located in one or more hardware devices in one or more computer systems. For example, the process can be implemented in data manager 210 in computer system 212 in FIG. 2.

The process begins by testing coupons (operation 700). Coupons are examples of test structures and can be manufactured using composite materials in this example. In operation 700, the coupons can have different orientations for layers of composite materials. Further, tab cuts, notches, or other features can also be cut into the coupons for testing. The testing can include pulling, twisting, bending, and application loads to determine the response the coupons to these different types of forces.

The process generates test data from the testing of test coupons (operation 702). The test data can include, for example, forced displacement data images of the coupons and other data.

The process then performs feature engineering to identify features from the test data (704). In this example, features can be standard features, transform features, selected features, or some combination thereof. With coupons, transform features can be created using a derivative of the test data can be performed to obtain tangent or secant stiffness. An integral of the test data can be performed to determine fractured energy is a transformed feature. Further, different features can be selected such as peak load, sharp drop, cracking, or other features in the test data or images.

The process then performs outlier detection and noise removal using different outlier detection methods (operation 706). The result of operation 706 identifies the outliers detected by the different outlier detection methods. Operation 706 can also optionally include removing noise from the test data before using outlier detection processes. The noise removal can be performed using filtering processes. In other cases, noise can be an outlier that can be removed as part of the outlier detection process.

The process identifies outlier types and causes (operation 708). The process terminates thereafter.

Figure 8:
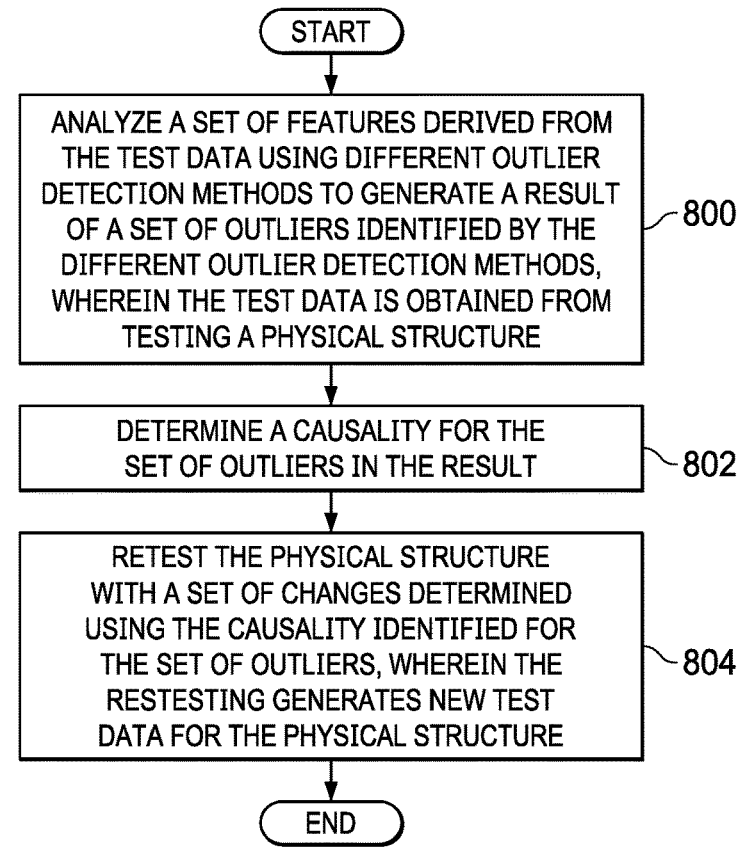
FIG. 8 is an illustration of a flowchart of a process for managing outliers in test data in accordance with an illustrative example.

Turning next to FIG. 8, an illustration of a flowchart of a process for managing outliers in test data is depicted in accordance with an illustrative example. The process in FIG. 8 can be implemented in hardware, software, or both. When implemented in software, the process can take the form of program code that is run by one of more processor units located in one or more hardware devices in one or more computer systems. For example, the process can be implemented in data manager 210 in computer system 212 in FIG. 2.

The process begins by analyzing a set of features derived from the test data using different outlier detection methods to generate a result of a set of outliers identified by the different outlier detection methods, wherein the test data is obtained from testing a physical structure (operation 800). The process determines a causality for the set of outliers in the result (operation 802).

The process retests the physical structure with a set of changes determined using the causality identified for the set of outliers, wherein the retesting generates new test data for the physical structure (operation 804). The process terminates thereafter.

Figure 9:
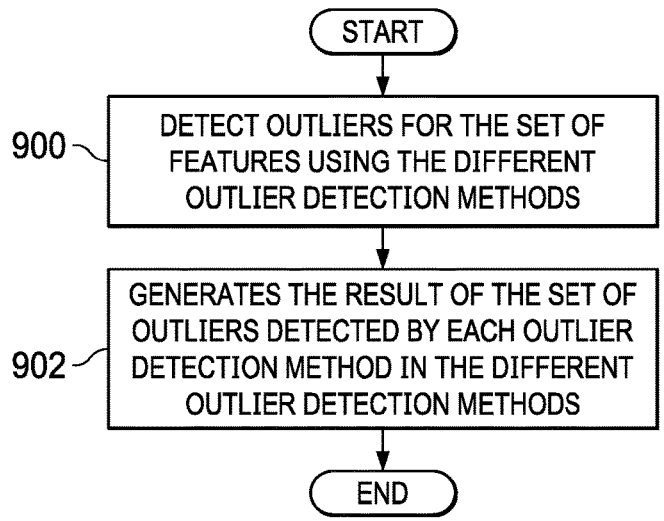
FIG. 9 is an illustration of a flowchart of a process for detecting outliers in accordance with an illustrative example.

Turning now to FIG. 9, an illustration of a flowchart of a process for detecting outliers is depicted in accordance with an illustrative example. The process illustrated in this figure is an example of additional operations that can be performed in the process in FIG. 8.

The process begins by detecting outliers for the set of features using the different outlier detection methods (operation 900). The process generates the result of the set of outliers detected by each outlier detection method in the different outlier detection methods (operation 9002). The process terminates thereafter.

Figure 10:
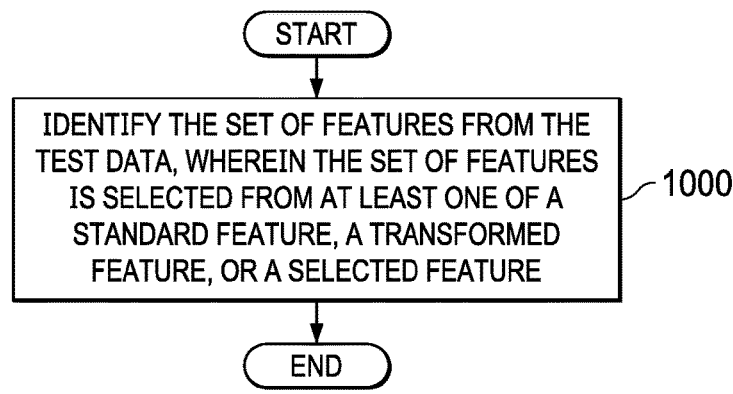
FIG. 10 is an illustration of a flowchart of a process for feature identification in accordance with an illustrative example.

With reference to FIG. 10, an illustration of a flowchart of a process for feature identification is depicted in accordance with an illustrative example. The operation in this flowchart is an example of an additional operation that can be performed in the process in FIG. 8.

The process identifies the set of features from the test data, wherein the set of features is selected from at least one of a standard feature, a transformed feature, or a selected feature (operation 1000). The process terminates thereafter.

Figure 11:
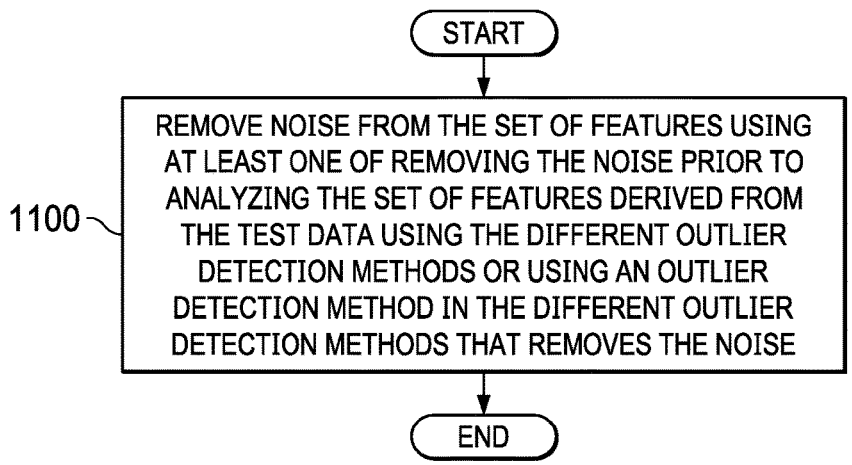
FIG. 11 is an illustration of a flowchart of a process for removing noise in accordance with an illustrative example.

Turning to FIG. 11, an illustration of a flowchart of a process for removing noise is depicted in accordance with an illustrative example. The operation in this flowchart is an example of an additional operation that can be performed with the process in FIG. 8.

The process removes noise from the set of features using at least one of removing the noise prior to analyzing the set of features derived from the test data using the different outlier detection methods or using an outlier detection method in the different outlier detection methods that removes the noise (operation 1100). The process terminates thereafter.

Figure 12:
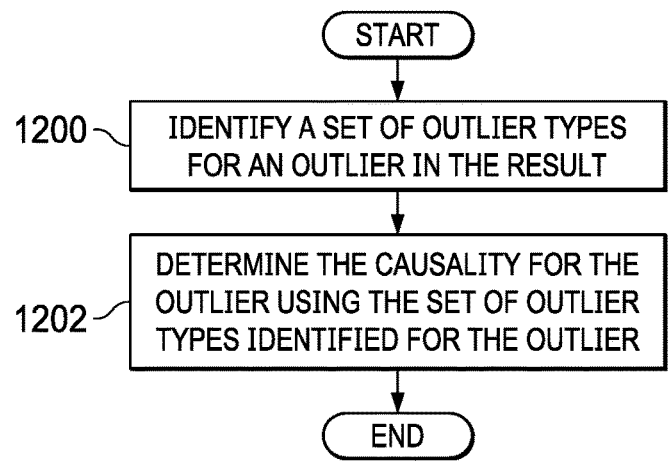
FIG. 12 is an illustration a flowchart of a process for determining causality in accordance with an illustrative example.

In FIG. 12, an illustration a flowchart of a process for determining causality is depicted in accordance with an illustrative example. The operations in this flowchart is an example of one implementation for operation 802 in FIG. 8.

The process begins by identifying a set of outlier types for an outlier in the result (operation 1200). The process determines the causality for the outlier using the set of outlier types identified for the outlier (operation 1202). The process terminates thereafter. The identification of the causality for the outlier using outlier types can be made based on historical data. For example, previous data collection and analysis of data can determine what causes of different types of outliers.

Figure 13:
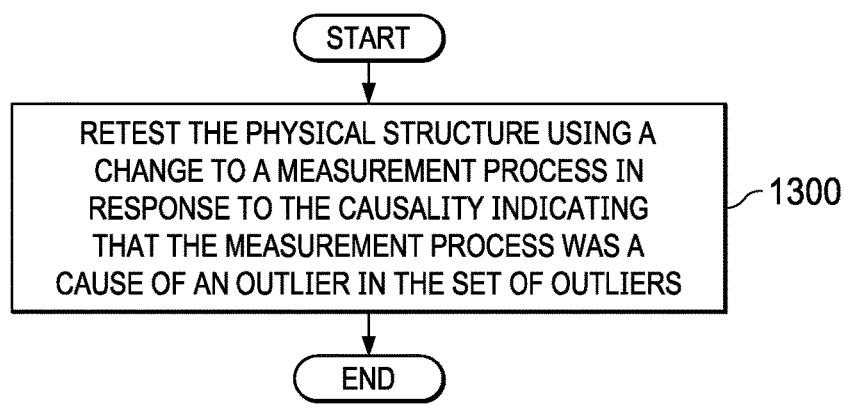
FIG. 13 is an illustration a flowchart of a process for retesting for a physical structure in accordance with an illustrative example.

With reference next to FIG. 13, an illustration a flowchart of a process for retesting for a physical structure is depicted in accordance with an illustrative example. The process in FIG. 13 is an example of one implementation for operation 804 in FIG. 8.

The process retests the physical structure using a change to a measurement process in response to the causality indicating that the measurement process was a cause of an outlier in the set of outliers (operation 1300). The process terminates thereafter.

Figure 14:
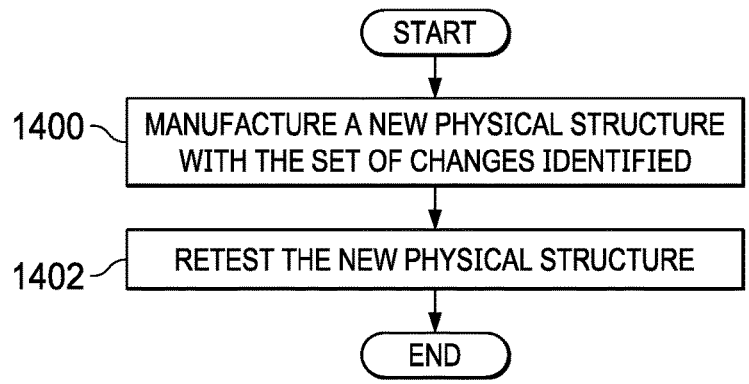
FIG. 14 is an illustration a flowchart of another process for retesting a physical structure in accordance with an illustrative example.

Next in FIG. 14, an illustration a flowchart of another process for retesting a physical structure is depicted in accordance with an illustrative example. The process in FIG. 14 is an example of one implementation for operation 804 in FIG. 8.

The process begins by manufacturing a new physical structure with the set of changes identified (operation 1400). In operation 1400, the set of changes can comprise at least one of, a measurement process change, a geometry change, a manufacturing parameter change, or a manufacturing process change.

The process retests the new physical structure (operation 1402). The process terminates thereafter.

Figure 15:
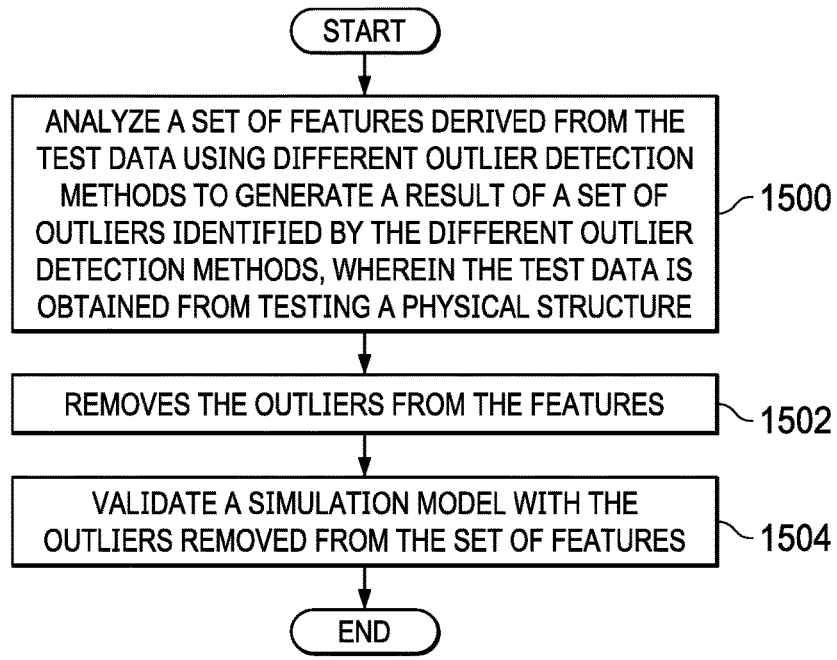
FIG. 15, an illustration a flowchart of a process for outlier detection is depicted in accordance with an illustrative example.

With reference to FIG. 15, an illustration a flowchart of a process for outlier detection is depicted in accordance with an illustrative example. The process illustrated in this figure can be implemented in hardware, software, or both. When implemented in software, the process can take the form of program code that is run by one of more processor units located in one or more hardware devices in one or more computer systems. For example, the process can be implemented in data manager 210 in computer system 212 in FIG. 2.

The process begins by analyzing a set of features derived from the test data using different outlier detection methods to generate a result of a set of outliers identified by the different outlier detection methods, wherein the test data is obtained from testing a physical structure (operation 1500).

The process removes the outliers from the features (operation 1502). The process validates a simulation model with the outliers removed from the set of features (operation 1504). The process terminates thereafter.

The flowcharts and block diagrams in the different depicted examples illustrate the architecture, functionality, and operation of some possible implementations of apparatuses and methods in an illustrative example. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative example, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 16:
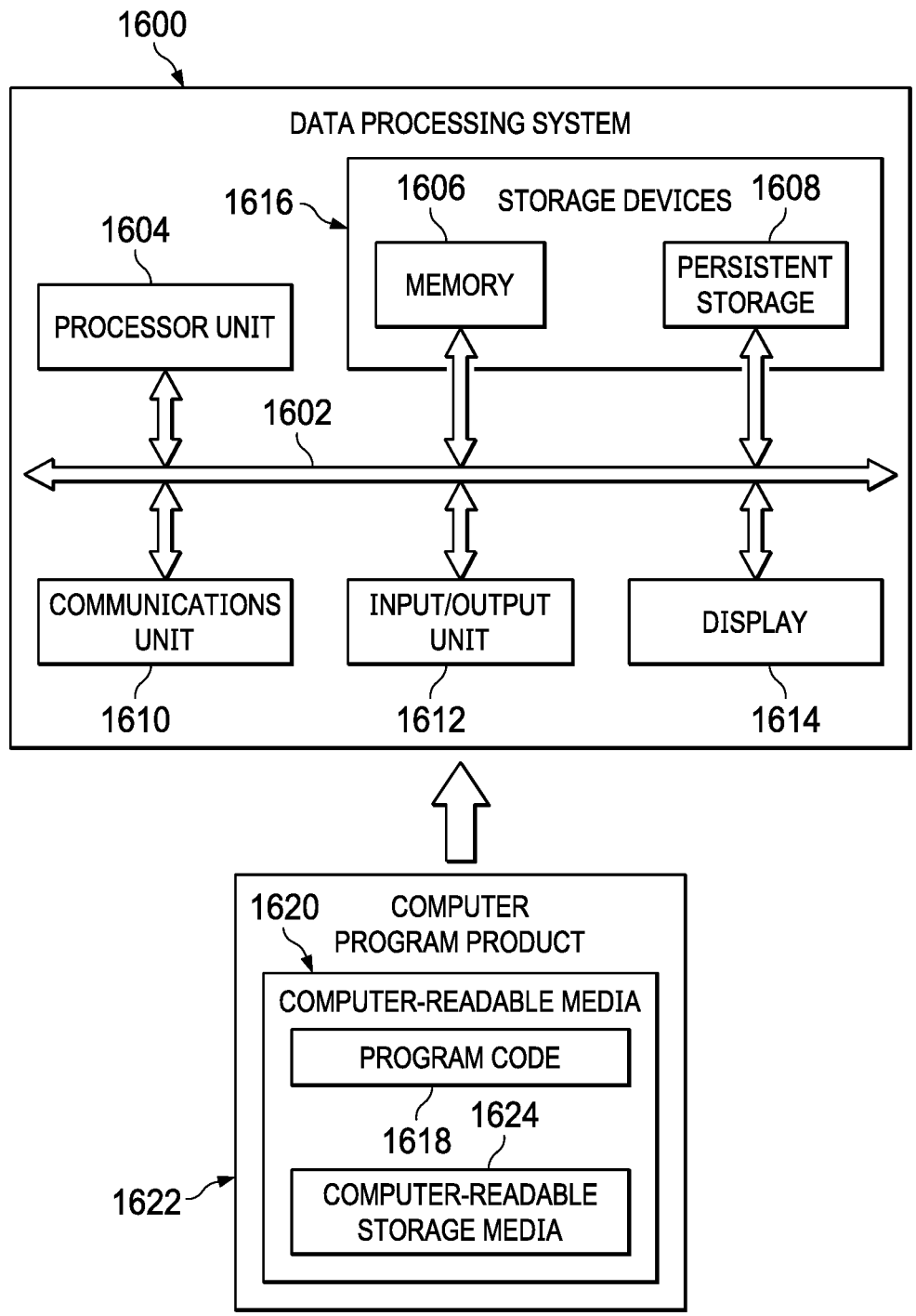
FIG. 16 is an illustration of a block diagram of a data processing system in accordance with an illustrative example.

Turning now to FIG. 16, an illustration of a block diagram of a data processing system is depicted in accordance with an illustrative example. Data processing system 1600 can be used to implement server computer 104, server computer 106, client devices 110, in FIG. 1. Data processing system 1600 can also be used to implement computer system 212 in FIG. 2. In this illustrative example, data processing system 1600 includes communications framework 1602, which provides communications between processor unit 1604, memory 1606, persistent storage 1608, communications unit 1610, input/output (I/O) unit 1612, and display 1614. In this example, communications framework 1602 takes the form of a bus system.

Processor unit 1604 serves to execute instructions for software that can be loaded into memory 1606. Processor unit 1604 includes one or more processors. For example, processor unit 1604 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1604 can may be implemented using one or more heterogeneous processor systems in which a main processor is present with secondary processors on a single chip. As another illustrative example, processor unit 1604 can be a symmetric multi-processor system containing multiple processors of the same type on a single chip.

Memory 1606 and persistent storage 1608 are examples of storage devices 1616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1616 may also be referred to as computer-readable storage devices in these illustrative examples. Memory 1606, in these examples, can be, for example, a random-access memory or any other suitable volatile or non-volatile storage device. Persistent storage 1608 can take various forms, depending on the particular implementation.

For example, persistent storage 1608 may contain one or more components or devices. For example, persistent storage 1608 can be a hard drive, a solid-state drive (SSD), a flash memory, a rewritable optical disk, a rewritable magnetic tape, or some combination of the above. The media used by persistent storage 1608 also can be removable. For example, a removable hard drive can be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that can be connected to data processing system 1600. For example, input/output unit 1612 can provide a connection for user input through at least one of a keyboard, a mouse, or some other suitable input device. Further, input/output unit 1612 can send output to a printer. Display 1614 provides a mechanism to display information to a user.

Instructions for at least one of the operating system, applications, or programs can be located in storage devices 1616, which are in communication with processor unit 1604 through communications framework 1602. The processes of the different examples can be performed by processor unit 1604 using computer-implemented instructions, which can be located in a memory, such as memory 1606.

These instructions are program instructions and are also referred to as program code, computer usable program code, or computer-readable program code that can be read and executed by a processor in processor unit 1604. The program code in the different examples can be embodied on different physical or computer-readable storage media, such as memory 1606 or persistent storage 1608.

Program code 1618 is located in a functional form on computer-readable media 1620 that is selectively removable and can be loaded onto or transferred to data processing system 1600 for execution by processor unit 1604. Program code 1618 and computer-readable media 1620 form computer program product 1622 in these illustrative examples. In the illustrative example, computer-readable media 1620 is computer-readable storage media 1624.

Computer-readable storage media 1624 is a physical or tangible storage device used to store program code 1618 rather than a media that propagates or transmits program code 1618. Computer-readable storage media 1624, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1618 can be transferred to data processing system 1600 using a computer-readable signal media. The computer-readable signal media are signals and can be, for example, a propagated data signal containing program code 1618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1620" can be singular or plural. For example, program code 1618 can be located in computer-readable media 1620 in the form of a single storage device or system. In another example, program code 1618 can be located in computer-readable media 1620 that is distributed in multiple data processing systems. In other words, some instructions in program code 1618 can be located in one data processing system while other instructions in program code 1618 can be located in one data processing system. For example, a portion of program code 1618 can be located in computer-readable media 1620 in a server computer while another portion of program code 1618 can be located in computer-readable media 1620 located in a set of client computers.

The different components illustrated for data processing system 1600 are not meant to provide architectural limitations to the manner in which different examples can be implemented. In some illustrative examples, one or more of the components may be incorporated in or otherwise form a portion of, another component. For example, memory 1606, or portions thereof, can be incorporated in processor unit 1604 in some illustrative examples. The different illustrative examples can be implemented in a data processing system including components in addition to or in place of those illustrated for data processing system 1600. Other components shown in FIG. 16 can be varied from the illustrative examples shown. The different examples can be implemented using any hardware device or system capable of running program code 1618.

Figure 17:
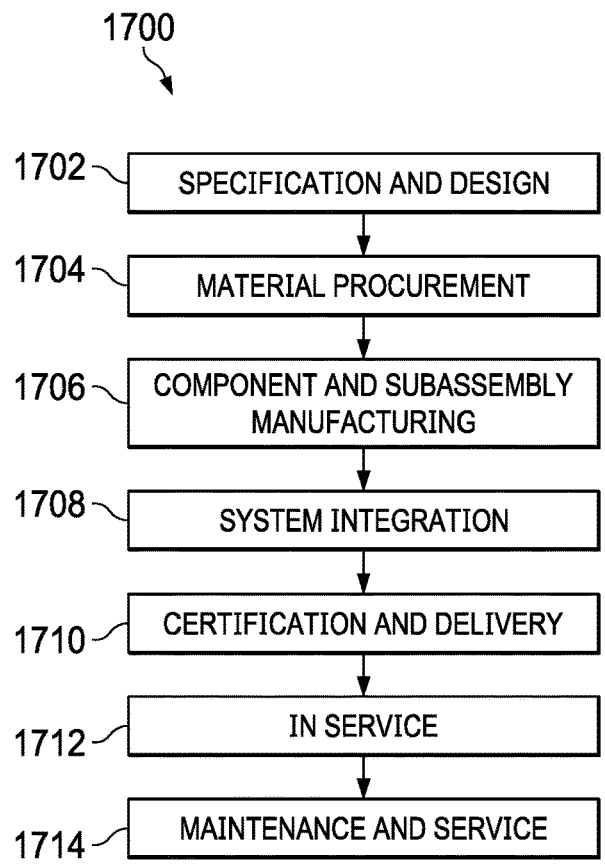
FIG. 17 is an illustration of an aircraft manufacturing and service method in accordance with an illustrative example.
Figure 18:
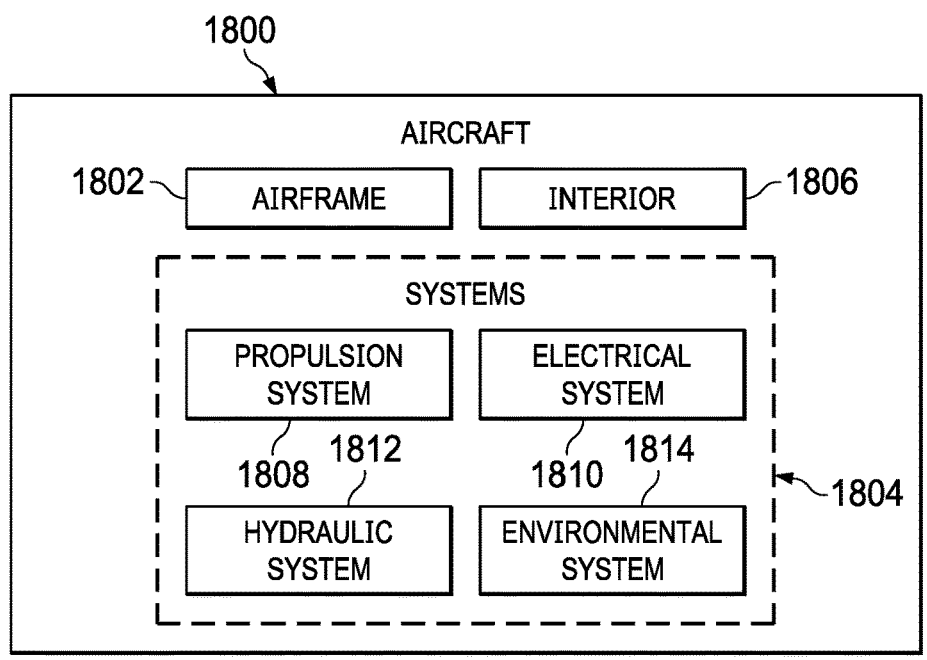
FIG. 18 is an illustration of a block diagram of an aircraft in which an illustrative example may be implemented.

Illustrative examples of the disclosure may be described in the context of aircraft manufacturing and service method 1700 as shown in FIG. 17 and aircraft 1800 as shown in FIG. 18. Turning first to FIG. 17, an illustration of an aircraft manufacturing and service method is depicted in accordance with an illustrative example. During pre-production, aircraft manufacturing and service method 1700 may include specification and design 1702 of aircraft 1800 in FIG. 18 and material procurement 1704.

During production, component and subassembly manufacturing 1706 and system integration 1708 of aircraft 1800 in FIG. 18 takes place. Thereafter, aircraft 1800 in FIG. 18 can go through certification and delivery 1710 in order to be placed in service 1712. While in service 1712 by a customer, aircraft 1800 in FIG. 18 is scheduled for routine maintenance and service 1714, which may include modification, reconfiguration, refurbishment, and other maintenance or service.

Each of the processes of aircraft manufacturing and service method 1700 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of an aircraft is depicted in which an illustrative example may be implemented. In this example, aircraft 1800 is produced by aircraft manufacturing and service method 1700 in FIG. 17 and may include airframe 1802 with plurality of systems 1804 and interior 1806. Examples of systems 1804 include one or more of propulsion system 1808, electrical system 1810, hydraulic system 1812, and environmental system 1814. Any number of other systems may be included. Although an aerospace example is shown, different illustrative examples may be applied to other industries, such as the automotive industry.

Apparatuses and methods embodied herein may be employed during at least one of the stages of aircraft manufacturing and service method 1700 in FIG. 17.

In one illustrative example, components or subassemblies produced in component and subassembly manufacturing 1706 in FIG. 17 can be fabricated or manufactured in a manner similar to components or subassemblies produced while aircraft 1800 is in service 1712 in FIG. 17. As yet another illustrative example, one or more apparatus examples, method examples, or a combination thereof can be utilized during production stages, such as component and subassembly manufacturing 1706 and system integration 1708 in FIG. 17. One or more apparatus examples, method examples, or a combination thereof may be utilized while aircraft 1800 is in service 1712, during maintenance and service 1714 in FIG. 17, or both. The use of a number of the different illustrative examples may substantially expedite the assembly of aircraft 1800, reduce the cost of aircraft 1800, or both expedite the assembly of aircraft 1800 and reduce the cost of aircraft 1800.

The use of data manager 210 to identify outliers, causality for outliers, and perform retesting can reduce the time needed to certify parts are systems during certification and delivery 1710. Further, the identification of outliers and causality for outliers can also be used to improve the quality of components during component and subassembly manufacturing 1706.

Figure 19:
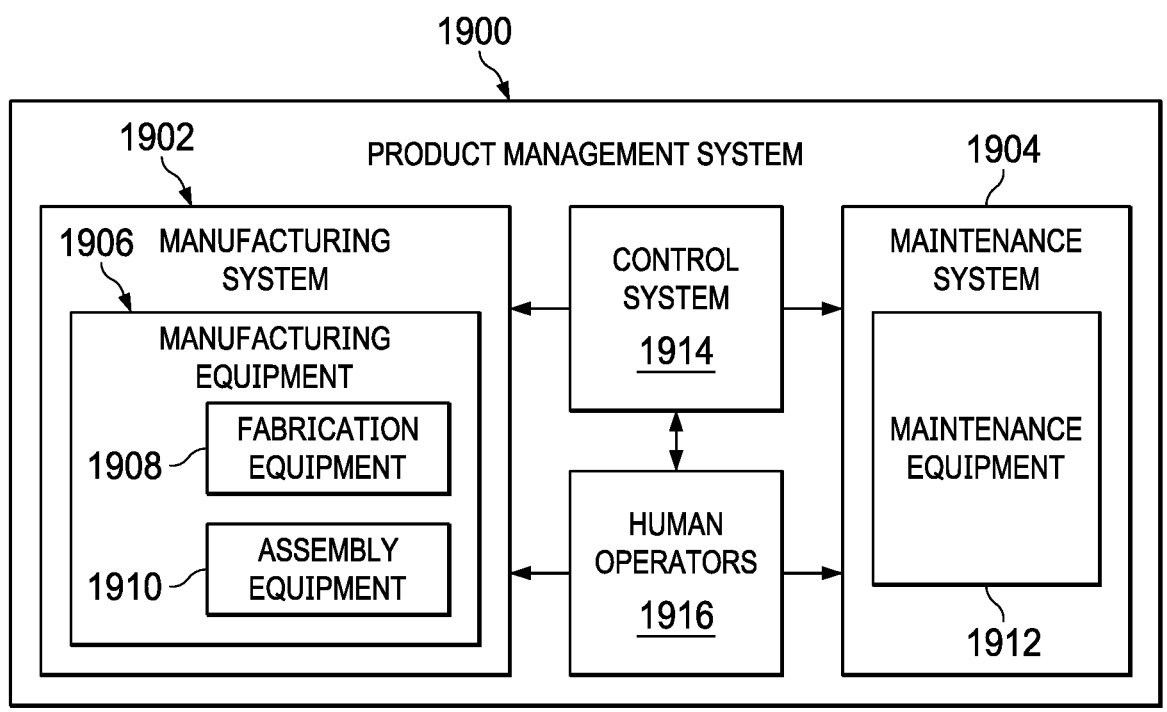
FIG. 19 is an illustration of a block diagram of a product management system in accordance with an illustrative example.

Turning now to FIG. 19, an illustration of a block diagram of a product management system is depicted in accordance with an illustrative example. Product management system 1900 is a physical hardware system. In this illustrative example, product management system 1900 includes at least one of manufacturing system 1902 or maintenance system 1904.

Manufacturing system 1902 is configured to manufacture products, such as aircraft 1800 in FIG. 18. As depicted, manufacturing system 1902 includes manufacturing equipment 1906. Manufacturing equipment 1906 includes at least one of fabrication equipment 1908 or assembly equipment 1910.

Fabrication equipment 1908 is equipment that used to fabricate components for parts used to form aircraft 1800 in FIG. 18. For example, fabrication equipment 1908 can include machines and tools. These machines and tools can be at least one of a drill, a hydraulic press, a furnace, an autoclave, a mold, a composite tape laying machine, an automated fiber placement (AFP) machine, a vacuum system, a robotic pick and place system, a flatbed cutting machine, a laser cutter, a computer numerical control (CNC) cutting machine, a lathe, or other suitable types of equipment. Fabrication equipment 1908 can be used to fabricate at least one of metal parts, composite parts, semiconductors, circuits, fasteners, ribs, skin panels, spars, antennas, or other suitable types of parts.

Assembly equipment 1910 is equipment used to assemble parts to form aircraft 1800 in FIG. 18. In particular, assembly equipment 1910 is used to assemble components and parts to form aircraft 1800 in FIG. 18. Assembly equipment 1910 also can include machines and tools. These machines and tools may be at least one of a robotic arm, a crawler, a faster installation system, a rail-based drilling system, or a robot. Assembly equipment 1910 can be used to assemble parts such as seats, horizontal stabilizers, wings, engines, engine housings, landing gear systems, and other parts for aircraft 1800 in FIG. 18.

In this illustrative example, maintenance system 1904 includes maintenance equipment 1912. Maintenance equipment 1912 can include any equipment needed to perform maintenance on aircraft 1800 in FIG. 18. Maintenance equipment 1912 may include tools for performing different operations on parts on aircraft 1800 in FIG. 18. These operations can include at least one of disassembling parts, refurbishing parts, inspecting parts, reworking parts, manufacturing replacement parts, or other operations for performing maintenance on aircraft 1800 in FIG. 18. These operations can be for routine maintenance, inspections, upgrades, refurbishment, or other types of maintenance operations.

In the illustrative example, maintenance equipment 1912 may include ultrasonic inspection devices, x-ray imaging systems, vision systems, drills, crawlers, and other suitable devices. In some cases, maintenance equipment 1912 can include fabrication equipment 1908, assembly equipment 1910, or both to produce and assemble parts that needed for maintenance.

Product management system 1900 also includes control system 1914. Control system 1914 is a hardware system and may also include software or other types of components. Control system 1914 is configured to control the operation of at least one of manufacturing system 1902 or maintenance system 1904. In particular, control system 1914 can control the operation of at least one of fabrication equipment 1908, assembly equipment 1910, or maintenance equipment 1912.

The hardware in control system 1914 can be implemented using hardware that may include computers, circuits, networks, and other types of equipment. The control may take the form of direct control of manufacturing equipment 1906. For example, robots, computer-controlled machines, and other equipment can be controlled by control system 1914. In other illustrative examples, control system 1914 can manage operations performed by human operators 1916 in manufacturing or performing maintenance on aircraft 1800. For example, control system 1914 can assign tasks, provide instructions, display models, or perform other operations to manage operations performed by human operators 1916.

In these illustrative examples, data manager 210 from FIG. 2 can be implemented in control system 1914 to manage at least one of the manufacturing or maintenance of aircraft 1800 in FIG. 18. For example, data manager 210 can perform analysis of test data obtained during at least one of manufacturing or maintenance of a product. The test data can be for the product or parts forming product. This test data can be analyzed to determine whether outliers are present and the causes of those outliers. When the causes of the outliers of current through manufacturing or maintenance processes, changes can be made and the product can be retested. This retesting can include using changes to a measurement process or remanufacturing the product or part.

As result, the use of data manager 210 can provide increased quality in the product. Further, data manager 210 can also provide test data that can be used for various certification or compliance processes to meet regulations or manufacturing requirements.

In the different illustrative examples, human operators 1916 can operate or interact with at least one of manufacturing equipment 1906, maintenance equipment 1912, or control system 1914. This interaction can occur to manufacture aircraft 1800 in FIG. 18.

Of course, product management system 1900 may be configured to manage other products other than aircraft 1800 in FIG. 18. Although product management system 1900 has been described with respect to manufacturing in the aerospace industry, product management system 1900 can be configured to manage products for other industries. For example, product management system 1900 can be configured to manufacture products for the automotive industry as well as any other suitable industries.

Some features of the illustrative examples are described in the following clauses. These clauses are examples of features not intended to limit other illustrative examples.

Clause 1
A method for managing a set of outliers in test data, the method comprising:
  analyzing, by a computer system, a set of features derived from the test data using different outlier detection methods to generate a result of the set of outliers identified by the different outlier detection methods, wherein the test data is obtained from testing a physical structure;
  determining, by the computer system, a causality for the set of outliers in the result; and
  retesting the physical structure with a set of changes determined using the causality identified for the set of outliers, wherein the retesting generates new test data for the physical structure.

Clause 2
The method according to clause 1 further comprising:
  detecting, by the computer system, outliers for the set of features using the different outlier detection methods; and
  generating, by the computer system, the result of the set of outliers detected by each outlier detection method in the different outlier detection methods.

Clause 3
The method according to one of clauses 1 or 2, wherein determining the causality for the set of outliers in the result comprises:
  identifying, by the computer system, a set of outlier types for an outlier in the result; and
  determining, by the computer system, the causality for the outlier using the set of outlier types identified for the outlier.

Clause 4
The method according to one of clauses 1, 2, or 3 further comprising:
  identifying, by the computer system, the set of features from the test data, wherein the set of features is selected from at least one of a standard feature, a transformed feature, or a selected feature.

Clause 5
The method according to one of clauses 1, 2, 3, or 4 wherein the different outlier detection methods are selected from two or more of a cosine similarity, a correlation analysis, a principal component analysis, a Sprague-Geers analysis, or a robust principal component analysis.

Clause 6
The method according to one of clauses according to one of clauses 1, 2, 3, 4, or 5, wherein retesting the physical structure with the set of changes comprises:
  retesting, by the computer system, the physical structure using a change to a measurement process in response to the causality indicating that the measurement process was a cause of an outlier in the set of outliers.

Clause 7
The method according to one of clauses 1, 2, 3, 4, 5, or 6, wherein retesting the physical structure with the set of changes comprises:
  manufacturing a new physical structure with the set of changes identified; and
  retesting the new physical structure.

Clause 8
The method according to clause 7, wherein the set of changes comprises at least one of, a measurement process change, a geometry change, a manufacturing parameter change, or a manufacturing process change.

Clause 9
The method according to one of clauses 1, 2, 3, 4, 5, 6, 7, or 8 further comprising:
  removing, by the computer system, noise from the set of features using at least one of removing the noise prior to analyzing the set of features derived from the test data using the different outlier detection methods or using an outlier detection method in the different outlier detection methods that removes the noise.

Clause 10
The method according to one of clauses 1, 2, 3, 4, 5, 6, 7, 8, or 9, wherein the result is a result matrix identifying outliers and outlier detection methods identifying the outliers.

Clause 11
The method according to one of clauses 1, 2, 3, 4, 5, 6, 7, 8, 9, or 10, wherein the physical structure is selected from a group comprising a composite part, a test coupon, an assembly, a system, an alloy part, and a metal structure.

Clause 12

An outlier management system comprising:
a computer system; and
a data manager in the computer system, wherein the data manager is configured to:
analyze a set of features derived from test data using different outlier detection methods to generate a result of a set of outliers identified by the different outlier detection methods, wherein the test data is obtained from testing a physical structure;
determine a causality for the set of outliers in the result; and
retest the physical structure with a set of changes determined using the causality identified for the set of outliers, wherein the retesting generates new test data for the physical structure.

Clause 13

The outlier management system according to clause 12, wherein the data manager is configured to:
detect outliers for the set of features using the different outlier detection methods; and
generate the result of the set of outliers identified by each outlier detection method in the different outlier detection methods.

Clause 14

The outlier management system according to one of clauses 12 or 13, wherein in determining the causality for the set of outliers in the result, the data manager is configured to:
identify a set of outlier types for an outlier in the result; and
determine the causality for the outlier using the set of outlier types identified for the outlier.

Clause 15

The outlier management system according to one of clauses 12, 13, or 14, wherein the data manager is configured to:
identify, by the computer system, the set of features from the test data, wherein the set of features is selected from at least one of a standard feature, a transformed feature, or a selected feature.

Clause 16

The outlier management system according to one of clauses 12, 13, 14, or 15, wherein the different outlier detection methods are selected from two or more of a cosine similarity, a correlation analysis, a principal component analysis, a Sprague-Geers analysis, or a robust principal component analysis.

Clause 17

The outlier management system according to one of clauses 12, 13, 14, 15, or 16, wherein in retesting the physical structure with the set of changes, the data manager is configured to:
retest the physical structure using a change to a measurement process in response to the causality indicating that the measurement process was a cause of an outlier in the set of outliers.

Clause 18

The outlier management system according to one of clauses 12, 13, 14, 15, 16, or 17, wherein in retesting the physical structure with the set of changes, the data manager is configured to:
manufacture a new physical structure with the set of changes identified; and
retest the new physical structure.

Clause 19

The outlier management system according to clause 18, wherein the set of changes comprises at least one of a measurement process change, a geometry change, a manufacturing parameter change, or a manufacturing process change.

Clause 20

The outlier management system according to one of clauses 12, 13, 14, 15, 16, 17, 18, or 19, wherein data manager is configured to:
remove noise from the set of features using at least one of removing the noise prior to analyzing the set of features derived from the test data using the different outlier detection methods or using an outlier detection method in the different outlier detection methods that removes the noise.

Clause 21

The outlier management system according to one of clauses 12, 13, 14, 15, 16, 17, 18, 19, or 20, wherein the result is a result matrix identifying outliers and outlier detection methods identifying the outliers.

Clause 22

The outlier management system according to one of clauses 12, 13, 14, 15, 16, 17, 18, 19, 20, or 21, wherein the physical structure is selected from a group comprising a composite part, an assembly, a test coupon, a system, an alloy part, and a metal structure.

Clause 23

A method for managing a set of outliers in test data, the method comprising:
analyzing, by a computer system, a set of features derived from the test data using different outlier detection methods to generate a result of the set of outliers identified by the different outlier detection methods, wherein the test data is obtained from testing a physical structure;
removing, by the computer system, the set of outliers from the features; and
validating, by the computer system, a simulation model with the outlier removed from the set of features.

Clause 24

A computer program product for managing a set of outliers in test data, the computer program product comprising a computer readable storage medium having program instructions embodied therewith, the program instructions executable by a computer system to cause the computer system to perform a method of:
analyzing, by a computer system, a set of features derived from the test data using different outlier detection methods to generate a result of the set of outliers identified by the different outlier detection methods, wherein the test data is obtained from testing a physical structure;
determining, by the computer system, a causality for the set of outliers in the result; and
retesting the physical structure with a set of changes determined using the causality identified for the set of outliers, wherein the retesting generates new test data for the physical structure.

Thus, a method, apparatus, system, and computer program product for managing outliers is provided. In one illustrative example, a computer system analyzes a set of features derived from the test data using different outlier detection methods to generate a result of a set of outliers identified by the different outlier detection methods. The test data is obtained from testing a physical structure. The computer system determines a causality for the set of outliers in the result. The physical structure is retested with a set of changes determined using the causality identified for the set of outliers. The retesting generates new test data for the physical structure.

The different processes illustrated in the flowcharts can be used to analyze test data in smaller amounts as compared to currently available outlier detection systems. By analyzing the test data using different outlier detection methods, the likelihood of more outliers or outlier types can be identified.

Further, in the different illustrative examples the original test data can be tested as standard features without changes, selected features in which portions of the test data selected or is transformed data. With transformed data, the original test data is transformed based on the theory governing physics of issues or problems identified for underlying features in physical structures. Different outlier detection methods may detect outliers using different types of test data selected from at least one of standard features, transform features, were selected features. The selected features can also include selected features from transformed test data.

As a result, these features in the different illustrative examples can more efficiently detect more types of outliers as compared to current systems. Further, noise can also be removed. As a result, the test data processed using the illustrative example can reveal the underlying true response of a physical structure more easily as compared to current techniques.

The description of the different illustrative examples has been presented for purposes of illustration and description and is not intended to be exhaustive or limited to the examples in the form disclosed. The different illustrative examples describe components that perform actions or operations. In an illustrative example, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative examples may provide different features as compared to other desirable examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for managing a set of outliers in test data, the method comprising a computer system:

analyzing, using different outlier detection methods, a set of standard features comprising the test data and identify outliers in the standard features, wherein the test data is obtained from testing a physical structure;

deriving, using governing physics of a potential problem of the physical structure and applying derivative or integral transformation to a portion of the test data, transformed features comprising features underlying the potential problem;

analyzing, using the different outlier detection methods, the transformed features and identifying outliers in the transformed features;

selecting, using the governing physics of the potential problem, data from at least one of the test data or the transformed features and forming selected features; and;

analyzing, using the different outlier detection methods, the selected features and identifying outliers in the selected features;

aggregating: the outliers in the standard features, the outliers in the transformed features, and the outliers in the selected features, into the set of outliers in the test data;

correlating a type of outlier revealed by each outlier detection method in the different outlier detection methods for each of: the standard features, the transformed features, and the selected features;

using a causality map, derived from historical data from testing structures, associating types of outliers and their causes with a number of different outlier detection methods;

subsequently determining, using the causality map, a causality for the set of outliers in the test data; and retesting the physical structure with a set of changes determined using the causality identified for the set of outliers, wherein the retesting generates new test data for the physical structure.

2. The method of claim 1, further comprising:

generating, by the computer system, a set of outliers detected by each outlier detection method in the different outlier detection methods.

3. The method of claim 1, further comprising the computer system:

identifying a set of outlier types for an outlier in set of data outliers; and determining the causality for the outlier by using the set of outlier types identified for the outlier.

4. The method of claim 1, wherein the physical structure is one of: an assembly, a test coupon, a system, an alloy part, and a metal structure.

5. The method of claim 1, wherein the different outlier detection methods are selected from two or more of a cosine similarity, a correlation analysis, a principal component analysis, a Sprague-Geers analysis, or a robust principal component analysis.

6. The method of claim 1, wherein retesting the physical structure with the set of changes comprises:

retesting, by the computer system, the physical structure using a change to a measurement process in response to the causality indicating that the measurement process was a cause of an outlier in the set of outliers.

7. The method of claim 1, wherein retesting the physical structure with the set of changes comprises:

manufacturing a new physical structure with the set of changes identified; and retesting the new physical structure.

8. The method of claim 7, wherein the set of changes comprises at least one of, a measurement process change, a geometry change, a manufacturing parameter change, or a manufacturing process change.

9. The method of claim 1 further comprising:

removing, by the computer system, noise from the set of features using at least one of removing the noise prior to analyzing the set of features derived from the test data using the different outlier detection methods or using an outlier detection method in the different outlier detection methods that removes the noise.

10. The method of claim 1, further comprising producing a result matrix identifying outliers and outlier detection methods identifying each outlier in the outliers.

11. The method of claim 1, wherein the physical structure is selected from a group comprising a composite part, a test coupon, an assembly, a system, an alloy part, and a metal structure.

12. An outlier management system that comprises:
a computer system; and
a data manager in the computer system, wherein the data manager is configured to:
analyze, based upon different outlier detection methods, a set of standard features derived from test data to identify a set of outliers in the standard features, wherein the test data is based upon tests of a physical structure;
derive, based upon governing physics of a potential problem of the physical structure and applying derivative or integral transformation to a portion of the test data, transformed features that comprise features underlying the potential problem;
analyze, based upon the different outlier detection methods, the transformed features and identify outliers in the transformed features;
select, based upon the governing physics of the potential problem, data from at least one of the test data or the transformed features and identify selected features; and;
analyze, based upon the different outlier detection methods, the selected features and identify outliers in the selected features;
aggregate: the outliers in the standard features, the outliers in the transformed features, and the outliers in the selected features, into the set of outliers in the test data;
correlate a type of outlier revealed by each outlier detection method in the different outlier detection methods for each of: the standard features, the transformed features, and the selected features;
associate, based upon a causality map derived from historical data from testing structures, types of outliers and their causes with a number of different outlier detection methods;
determine a causality for the set of outliers in the test data; and
retest the physical structure with a set of changes, determined based upon the causality identified for the set of outliers in the test data, that generate new test data for the physical structure.

13. The outlier management system of claim 12, wherein the causality comprises: a premature failure, a stiffness variation, a stiffness error, or a nonlinear variation.

14. The outlier management system of claim 12, wherein the causality comprises: test equipment noisy data, a delamination, or a damage mode present in an image.

15. The outlier management system of claim 12, wherein the data manager is further configured to identify, by the computer system, the set of features from the test data, wherein the set of features is selected from at least one of a standard feature, a transformed feature, or a selected feature.

16. The outlier management system of claim 12, wherein the different outlier detection methods are selected from two or more of a cosine similarity, a correlation analysis, a principal component analysis, a Sprague-Geers analysis, or a robust principal component analysis.

17. The outlier management system of claim 12, wherein in retesting the physical structure with the set of changes, the data manager is configured to:

retest the physical structure using a change to a measurement process in response to the causality indicating that the measurement process was a cause of an outlier in the set of outliers.

18. The outlier management system of claim 12, wherein in retesting the physical structure with the set of changes, the data manager is configured to:
manufacture a new physical structure with the set of changes identified; and
retest the new physical structure.

19. The outlier management system of claim 18, wherein the set of changes comprises at least one of a measurement process change, a geometry change, a manufacturing parameter change, or a manufacturing process change.

20. The outlier management system of claim 12, wherein the data manager is configured to:
remove noise from the set of features using at least one of removing the noise prior to analyzing the set of features derived from the test data using the different outlier detection methods or using an outlier detection method in the different outlier detection methods that removes the noise.

21. The outlier management system of claim 12, wherein set of outliers in the data set is formed as a result matrix that identifies outliers and outlier detection methods that identify the outliers.

22. The outlier management system of claim 12, wherein the physical structure is selected from a group comprising a composite part, an assembly, a test coupon, a system, an alloy part, and a metal structure.

23. A method for managing a set of outliers in test data, the method comprising a computer system:
analyzing, using different outlier detection methods, a set of standard features comprising the test data and identifying outliers in the standard features, wherein the test data is obtained from testing a physical structure;
deriving, using governing physics of a potential problem of the physical structure and applying derivative or integral transformation to a portion of the test data, transformed features comprising features underlying the potential problem;
analyzing, using the different outlier detection methods, the transformed features and identifying outliers in the transformed features;
selecting, using the governing physics of the potential problem, data from at least one of the test data or the transformed features and forming selected features; and;
analyzing, using the different outlier detection methods, the selected features and identifying outliers in the selected features;
aggregating: the outliers in the standard features, the outliers in the transformed features, and the outliers in the selected features, into the set of outliers in the test data;
correlating a type of outlier revealed by each outlier detection method in the different outlier detection methods for each of: the standard features, the transformed features, and the selected features;
using a causality map, derived from historical data from testing structures, associating types of outliers and their causes with a number of different outlier detection methods;

subsequently determining, using the causality map, a causality for the set of outliers in the test data;
removing the set of outliers from the features; and
validating a simulation model with the set of outliers removed from the set of features.

* * * * *